United States Patent

Yatsushiro et al.

[15] 3,639,790
[45] Feb. 1, 1972

[54] MOTOR CASE

[72] Inventors: Kenji Yatsushiro, Chicago; George F. Kuchuris, Westchester, both of Ill.

[73] Assignee: Controls Company of America, Melrose Park, Ill.

[22] Filed: June 22, 1970

[21] Appl. No.: 48,414

[52] U.S. Cl. ............................................310/89, 310/162
[51] Int. Cl. .......................................................H02k 5/00
[58] Field of Search..................310/89, 162, 163, 164, 83, 310/85, 99, 40 MM, 258, 259

[56] References Cited

UNITED STATES PATENTS

| | | | |
|---|---|---|---|
| 3,452,228 | 6/1969 | Woolley | 310/162 |
| 3,448,306 | 6/1969 | Murray | 310/162 |
| 2,673,939 | 3/1954 | Tetro | 310/162 |
| 2,823,327 | 2/1958 | Kohlhagen | 310/162 |
| 3,231,770 | 1/1966 | Hyde | 310/162 |
| 3,274,411 | 9/1966 | Kavanaugh | 310/164 |

Primary Examiner—J. D. Miller
Assistant Examiner—R. Skudy
Attorney—John W. Michael, Gerrit D. Foster, Bayard H. Michael, Paul R. Puerner, Joseph A. Gemignani, Andrew O. Riteris and Spencer B. Michael

[57] ABSTRACT

The motor case has a cylindrical sidewall which receives and centers the dividerlike gearcase pressed into the motor case. The cover is centered by and seats on the motor case which is staked to retain the cover without transfer of staking pressures to the gearcase. Since the motor case centers the gear case and the cover, concentricity is readily attained and shafts journaled in the parts are assured alignment.

1 Claims, 3 Drawing Figures

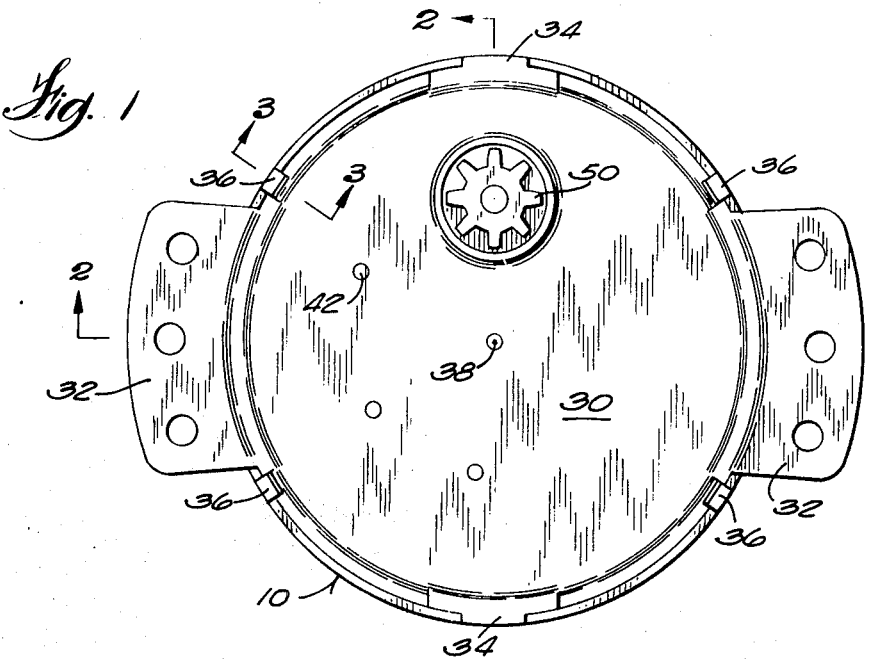
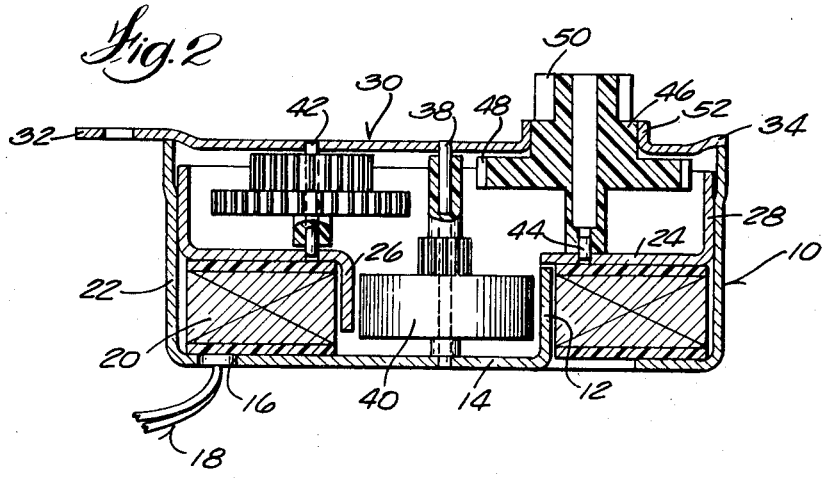
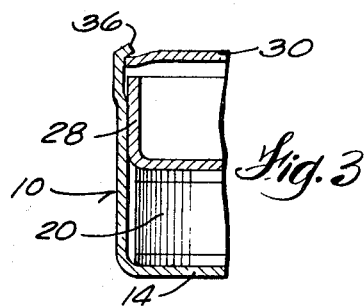

MOTOR CASE

BACKGROUND OF THE INVENTION

Synchronous motors of the present type are manufactured in very high volume and cost is very important. The motor replaced by the present design had a case which had a noncircular sidewall which gave a questionable point of reference when pressing the gear case into the motor case. Further, the cover was secured to the gearcase so errors could become additive. This, then, reflected in shaft misalignment or stator poles being out of the desired concentricity with the rotor. Since the cover was staked to the gearcase, the position of the gearcase relative to the motor case could be disturbed by the staking pressure.

SUMMARY OF INVENTION

The construction described in the abstract virtually eliminates distortion of the case parts during assembly with a consequent reduction in rejects. Shaft alignment is maintained as is concentricity of the stator poles. Staking pressures cannot be transferred to the gearcase to affect its spacing relative to the motor case and the coil between the two.

DESCRIPTION OF DRAWINGS

FIG. 1 is a plan view of the assembled motor.
FIG. 2 is a vertical section on line 2—2 in FIG. 1.
FIG. 3 is a partial section on line 3—3 of FIG. 1.

DESCRIPTION OF PREFERRED EMBODIMENT

The motor case 10 is stamped, formed and drawn to provide a cuplike configuration having the stator poles 12 projecting upwardly from the flat bottom 14 which is apertured at 16 to allow passage of leads 18 from coil 20 positioned between the motor case stator poles and the cylindrical sidewall 22 of the case. The dividerlike gearcase 24 has depending stator poles 26 and a sidewall 28 which is pressed into and centered by the motor case sidewall 22. Since concentricity of the gearcase poles 26 is readily attained and since the gearcase is centered by the motor case, concentricity of the stator poles 12 and 26 is readily obtained. The upper edge of the gearcase is below the upper edge of the motor case so the staking pressure applied to the motor case to retain cover 30 cannot be transmitted to the gearcase to adversely affect the concentricity of the poles. Cover 30 is stamped and formed so the major portion of its periphery is circular and received inside and centered by the motor case. Mounting ears 32 project from the cover and overlie the motor case, being offset upwardly slightly to rest on the case lip. Support tabs 34 also are formed to rest on the case lip. When the cover has been oriented with respect to the motor case, the case is staked at 36 to fix the cover position. The staking forces cannot upset the alignment/concentricity of the parts and the ears 32 and tabs 34 give the cover enough support to prevent distortion of the cover.

With this arrangement, shaft 38 of rotor 40 can be journaled in the cover 30 and motor case 10 with assurance of alignment. Similarly, shaft 42 can be journaled in the gearcase and cover. The output shaft 44 is journaled in the gearcase while the shoulder 46 between gears 48 and 50 is journaled in the outwardly formed journal 52 in the cover. The orientation of the cover relative to the remainder is achieved by use of proper assembly jigs or by fixing the various shafts in the gearcase and then orienting the cover by orienting the shaft apertures in the cover with the shafts.

We claim:
1. A synchronous motor comprising:
    a cuplike motor case having a flat bottom portion and a cylindrical sidewall with stator poles projecting upwardly into said case;
    a dividerlike case within said motor case and having a flat bottom portion and being centered by said motor case and provided with stator poles which depend from said flat bottom portion and which extend between said stator poles of said motor case, said gear case including a cylindrical sidewall having a press fit inside said motor case with the upper edge of said gearcase terminating below the upper edge of the sidewall for said motor case;
    a cover having a generally circular periphery fitting within said motor case and including mounting ears which extend radially outward beyond the cylindrical sidewall of said motor case, said mounting ears lying in a plane slightly above the plane of said cover whereby said mounting ears overlie the upper edge of the cylindrical sidewall of said motor case while the cover fits inside said motor case and is centered thereby, said motor case being staked on each side of said mounting ears to retain said cover on said motor case;
    a coil between the flat bottom portion of said motor case and the flat bottom portion of said gearcase and surrounding said stator poles;
    a rotor inside said stator poles and mounted on a shaft having one end thereof mounted in the flat bottom portion of said motor case and its opposite end mounted in said cover;
    a gear train in the space between the flat bottom portion of said gearcase and said cover with the gears thereof mounted on shafts each having one end thereof mounted in the flat bottom portion of said gearcase and its opposite end mounted in said cover; and
    tabs formed on and projecting from said cover to overlie the upper edge of the cylindrical sidewall of said motor case between said mounting ears to prevent distortion of said cover during staking.

* * * * *